US008027942B2

(12) United States Patent
de Tremiolles et al.

(10) Patent No.: US 8,027,942 B2
(45) Date of Patent: Sep. 27, 2011

(54) METHOD AND CIRCUITS FOR ASSOCIATING A COMPLEX OPERATOR TO EACH COMPONENT OF AN INPUT PATTERN PRESENTED TO AN ARTIFICIAL NEURAL NETWORK

(75) Inventors: Ghislain Imbert de Tremiolles, Saint Paul (FR); Pascal Tannhof, Fontainebleau (FR)

(73) Assignee: International Business Machines Corporation, Armonk, NY (US)

( * ) Notice: Subject to any disclaimer, the term of this patent is extended or adjusted under 35 U.S.C. 154(b) by 3215 days.

(21) Appl. No.: 09/951,786

(22) Filed: Sep. 12, 2001

(65) Prior Publication Data

US 2002/0073053 A1    Jun. 13, 2002

(30) Foreign Application Priority Data

Dec. 13, 2000    (EP) .................................... 00480119

(51) Int. Cl.
*G06F 15/18*    (2006.01)
*G06E 1/00*    (2006.01)
*G06E 3/00*    (2006.01)
*G06G 7/00*    (2006.01)

(52) U.S. Cl. ...................................................... 706/18
(58) Field of Classification Search ............... 706/18–26
See application file for complete search history.

(56) References Cited

U.S. PATENT DOCUMENTS

| | | | | |
|---|---|---|---|---|
| 4,922,135 A | * | 5/1990 | Mollier et al. | 326/115 |
| 5,010,257 A | * | 4/1991 | Boudon et al. | 326/110 |
| 5,023,478 A | * | 6/1991 | Boudon et al. | 326/110 |
| 5,089,725 A | * | 2/1992 | Mollier et al. | 326/127 |
| 5,155,572 A | * | 10/1992 | Bonneau et al. | 257/583 |
| 5,621,863 A | * | 4/1997 | Boulet et al. | 706/26 |

(Continued)

FOREIGN PATENT DOCUMENTS

FR    EP00480064.5    7/2000

OTHER PUBLICATIONS

An adaptive function neural network (ADFUNN) for phrase recognition, Miao Kang; Palmer-Brown, D.; Neural Networks, 2005. IJCNN '05. Proceedings. 2005 IEEE International Joint Conference on, vol. 1 Digital Object Identifier: 10.1109/IJCNN.2005.1555898 Publication Year: 2005 , pp. 593-597 vol. 1.*

(Continued)

*Primary Examiner* — Michael Holmes
(74) *Attorney, Agent, or Firm* — David A. Cain

(57) ABSTRACT

The method and circuits of the present invention aim to associate a complex component operator (CC_op) to each component of an input pattern presented to an input space mapping algorithm based artificial neural network (ANN) during the distance evaluation process. A complex operator consists in the description of a function and a set of parameters attached thereto. The function is a mathematical entity (either a logic operator e.g. match(Ai,Bi), abs(Ai−Bi), . . . or an arithmetic operator, e.g. >, <, . . . ) or a set of software instructions possibly with a condition. In a first embodiment, the ANN is provided with a global memory, common for all the neurons of the ANN, that stores all the CC_ops. In another embodiment, the set of CC_ops is stored in the prototype memory of the neuron, so that the global memory is no longer physically necessary. According to the present invention, a component of a stored prototype may now designate objects of different nature. In addition, either implementation significantly reduces the number of components that are required in the neurons, therefore saving room when the ANN is integrated in a silicon chip.

7 Claims, 8 Drawing Sheets

U.S. PATENT DOCUMENTS

| | | | | |
|---|---|---|---|---|
| 5,710,869 | A * | 1/1998 | Godefroy et al. | 706/41 |
| 5,717,832 | A * | 2/1998 | Steimle et al. | 706/33 |
| 5,740,326 | A * | 4/1998 | Boulet et al. | 706/27 |
| 6,347,309 | B1 * | 2/2002 | De Tremiolles et al. | 706/20 |
| 6,377,941 | B1 * | 4/2002 | Steimle et al. | 706/26 |
| 6,502,083 | B1 * | 12/2002 | Louis et al. | 706/27 |
| 6,523,018 | B1 * | 2/2003 | Louis et al. | 706/27 |
| 6,622,135 | B1 * | 9/2003 | Imbert De Tremiolles et al. | 706/20 |
| 6,748,405 | B2 * | 6/2004 | de Tremiolles et al. | 708/207 |
| 6,782,373 | B2 * | 8/2004 | de Tremiolles et al. | 706/15 |
| 6,983,265 | B2 * | 1/2006 | Tannhof et al. | 706/26 |
| 7,133,854 | B2 * | 11/2006 | Imbert De Tremiolles et al. | 706/20 |
| 7,254,565 | B2 * | 8/2007 | De Tremiolles et al. | 706/28 |
| 7,352,918 | B2 * | 4/2008 | Tannhof et al. | 382/298 |
| 7,734,117 | B2 * | 6/2010 | Tannhof et al. | 382/298 |

OTHER PUBLICATIONS

Recognition of handwritten phrases as applied to street name images, Kim, G.; Govindaraju, V.; Computer Vision and Pattern Recognition, 1996. Proceedings CVPR '96, 1996 IEEE Computer Society Conference on Digital Object Identifier: 10.1109/CVPR.1996.517112 Publication Year: 1996 , pp. 459-464.*

Learning of word stress in a sub-optimal second order back-propagation neural network, Ricotti, L.P.; Ragazzini, S.; Martinelli, G.; Neural Networks, 1988., IEEE International Conference on Digital Object Identifier: 10.1109/ICNN.1988.23867 Publication Year: 1988 , pp. 355-361 vol. 1.*

The Effect of Target Vector Selection on the Invariance of Classifier Performance Measures, Sakk, E.; Schneider, D.J.; Myers, C.R.; Cartinhour, S.W.; Neural Networks, IEEE Transactions on vol. 20 , Issue: 5 Digital Object Identifier: 10.1109/TNN.2008.2011809 Publication Year: 2009 , pp. 745-757.*

An adaptive function neural network (ADFUNN) classifier, Miao Kang; Palmer-Brown, D.; Neural Networks and Brain, 2005. ICNN&B '05. International Conference on vol. 1 Digital Object Identifier: 10.1109/ICNNB.2005.1614681 Publication Year: 2005 , pp. 586-590.*

A neural fuzzy training approach for continuous speech recognition improvement, Komori, Y.; Acoustics, Speech, and Signal Processing, 1992. ICASSP-92., 1992 IEEE International Conference on vol. 1 Digital Object Identifier: 10.1109/ICASSP.1992.225886 Publication Year: 1992 , pp. 405-408 vol. 1.*

A systematic and reliable approach to pattern classification, Doraiswami, R.; Stevenson, M.; Rajan, S.; Intelligent Processing and Manufacturing of Materials, 1999. IPMM '99. Proceedings of the Second International Conference on vol. 2 Digital Object Identifier: 10.1109/IPMM.1999.791479 Publication Year: 1999 , pp. 735-741 vol.*

Distance protection using an artificial neural network, Qi, W.; Swift, G.; McLaren, P.; Developments in Power System Protection, Sixth International Conference on (Conf. Publ. No. 434) Digital Object Identifier: 10.1049/cp:19970083 Publication Year: 1997 , pp. 286-290.*

* cited by examiner

US 8,027,942 B2

METHOD AND CIRCUITS FOR ASSOCIATING A COMPLEX OPERATOR TO EACH COMPONENT OF AN INPUT PATTERN PRESENTED TO AN ARTIFICIAL NEURAL NETWORK

FIELD OF THE INVENTION

The present invention relates to artificial neural networks and more particularly to a method and circuits for associating a complex operator to each component of an input pattern presented to an input space mapping algorithm based artificial neural network (ANN). A complex operator comprises a function (e.g. a mathematical entity based on a logic or arithmetic operator) and a set of parameters attached thereto. The nature of the function determines the signification and the subsequent exploitation of the parameters. The result of the operation performed by the function for a determined component in a distance evaluation process, can modify or inhibit the processing of other components.

BACKGROUND OF THE INVENTION

In today's data processing, a lot of recognition, prediction, and computation tasks are performed using reference databases used to characterize input data. Depending upon the application, these reference databases contain patterns that are sub-images, sub-signals, subsets of data and combinations thereof. The input patterns that are stored in these reference databases are referred to hereinbelow as prototypes. As known to those skilled in the art, they are generally represented by a vector, i.e. an array in a p-dimensional space. Well-known methods for characterizing new (unknown) input patterns using reference databases, are based upon the input space mapping algorithms like the K-Nearest-Neighbor (KNN) or the Region Of Influence (ROI). The base principle of these algorithms is to compute the distance (Dist) between the input pattern and each of the stored prototypes in order to find the closest one(s) depending or not upon predetermined thresholds. U.S. Pat. No. 5,621,863 assigned to IBM Corp describes artificial neural networks based on such input space mapping algorithms that include innovative elementary processors of a new type, referred to as the ZISC® neurons (ZISC® is a registered trademark of IBM Corp). An essential characteristic of the ZISC® neurons lies in their ability to work in parallel, i.e. when an input pattern is presented to the ANN, all ZISC® neurons compute the distance between the input pattern and the prototypes stored therein at the same time. One important aspect of these algorithms is the relation that is used to compute the distance, referred to as the "norm", that is used in the distance evaluation process. The choice of this norm is determined by the problem to be solved on the one hand, and on the other hand, by the knowledge used to solve this problem. In a ZISC® neuron, the distance between an input pattern A and the prototype B stored therein (each having p components), also referred to as the "final" distance (Dist), is calculated using either the MANHATTAN distance (L1 norm), i.e. Dist=$\Sigma$ (abs (Ai−Bi)) or the MAXIMUM distance (Lsup norm), i.e. Dist=max (abs (Ai−Bi)) wherein Ai and Bi are the components of rank i (variable i varies from 1 to p) for the input pattern A and the stored prototype B respectively. Note that "abs" is an usual abbreviation for "absolute value". Other norms exist; for instance the L2 norm such as Dist=$\sqrt{\Sigma(Ai-Bi)^2}$. The L2 norm is said to be "Euclidean" while the L1 and Lsup norms are examples of "non-Euclidean" norms, however, they all imply the computation of a difference (Ai−Bi) for each component in the "elementary" (dist) distance evaluation. As a matter of fact, the "absolute value of a difference" operator, i.e. "abs (Ai−Bi)", is extensively used in the ANN field, although other operators, such as the "match/no match" operator (also written "match (Ai,Bi)"), are more adapted to some specific situations. In the ZISC® neuron, the choice between the L1 or Lsup norm is determined by the value of a single bit referred to as the "norm" bit No stored in the neuron. Other Euclidean or non-Euclidean norms are known to those skilled in the art in the ANN field.

On the other hand, so far, only one operator has been used for the totality of the components of a stored prototype. For instance, in the ZISC neuron, the "abs (Ai−Bi)" operator is applied to each component to determine an "elementary" distance. Then, the successive elementary distances are summed in the case of the L1 norm or the maximum value thereof is selected in the case of the Lsup norm to determine the distance (Dist), also referred to as the "final" distance. However, due to the nature of the components, in some instances, it could be worthwhile to associate an operator that would be different for each component of the input pattern/stored prototype depending upon the application. For example, if the two components of a stored prototype characterizing a sub-image describe a color index and the number of pixels of that color index in the sub-image respectively, it would be useful to apply the "match/no match" operator for the color index related component and an "absolute value of a difference" operator for the number of pixels related component. The latter approach is described in EP co-pending patent application No 00480064.5 filed on Jul. 13, 2000 assigned to IBM Corp (attorney docket FR 9 1999 118).

In summary, as of yet, the operator is thus either the same for all the components of the input pattern/stored prototypes (see the aforementioned US patent) or can be different from one component to another (see the co-pending patent application), but, in both cases, it is predetermined. In other words, it is fixed once for all before the input pattern is presented to the ANN, and thus, it is not open to variations in the distance evaluation process. However, it could be worthwhile in some instances, that depending upon the result of the operation performed for a determined component in the distance evaluation process, the processing of other components can be modified or inhibited.

For example, let us consider some characteristics of a transportation system. The first component is used to code the transport type, e.g. plane or boat and the corresponding operator is "match/no match". The second component is used to code the number of wings or rudders and the corresponding norm is based on an "absolute value of a difference" operator. The third component is used to code the power of the transport system, still with a "absolute value of a difference" operator. Let us assume now that a plurality of prototypes describing different planes and boats have been stored in the ANN. Let us now assume that an input pattern representing a plane is presented to the ANN, it would be desirable to perform the elementary distance evaluation on the second component of only the prototypes storing a plane and to exclude or inhibit the evaluation for prototypes storing a boat, because, obviously in the latter case, the computation of the elementary distance between the number of wings and the number of rudders would not be significant. The "match (Ai,Bi)" operator implicitly implies a condition, e.g. if Ai=Bi (i.e. "match", then the result is equal to zero and if Ai≠Bi (i.e. "no match"), then the result is equal to one, but, whatever the result, 1 or 0, the distance evaluation process is continued with the second component. Obviously, it would be highly desirable that a condition be set on the result itself whenever necessary. For instance, if the result is 1 (i.e. "no match"), no elementary distance calculation will be made for the second component, or if made it will not be exploited. In summary, it does appear the necessity of a condition, e.g. a threshold attached to the result of an operation for a determined component that would impact the processing of the following components. For instance, the result of the condition could be the number of components that must be overlooked.

In addition, if the first component does not match, an offset, playing the role of a penalty, should be used for compensation purposes, to amplify the "no match" effect by significantly increasing the elementary distance for the first component. Otherwise, it would mean that if components match, the distances would be greater than if the components do not match, which would not be acceptable.

Finally, still another valuable requirement would concern the variability of the elementary distances evaluated for each component, so that it could be worthwhile to differently balance some of them, mainly when components of different nature are used. For example, let us consider again the previous transportation system in which the first, second and third components are used to code the transport type (plane or boat), the number of wings or rudders (the nature of the second component thus depends upon the nature of the first component which reflects the transport type) and the power. It is obvious that the number measuring the difference between the wings or rudders is quite small, if not negligible, compared to the number measuring the difference between the powers. Therefore, it can be necessary to balance some calculated elementary distances with a weight.

To date, these features are not achievable. Therefore, it would be highly desirable to define a "complex" operator (to be distinguished from the "simple" operators that have been used so far), that would be capable to undertake certain tasks in the distance evaluation process depending upon the results obtained at previous elementary distance calculations. To date, there is no known technique that would allow one to condition the calculation of the elementary distance for a component of the input pattern presented to an ANN during the distance evaluation process to the occurrence of an event. As a result, it is not possible to have a component designating objects of different nature (e.g. in the above example either wings or rudders), that would be very interesting in terms of component count reduction.

These features are not available in conventional ANNs to date for the following reasons. If implemented in hardware, a too considerable amount of memory and logic circuits would be required in the silicon chip, making this approach complex and expensive. On the other hand, their implementation in software is not realistic, because the time that would be required to execute the distance evaluation process. The great advantage of ANNs, i.e. their parallel structure that allows one to perform the elementary distance evaluations at the highest possible speed, would be lost.

This lack of implementation either in hardware or in software is a serious limit to extend the use of conventional input space mapping algorithm based neural networks and in particular of ANNs constructed with ZISC® neurons.

SUMMARY OF THE PRESENT INVENTION

It is therefore a primary object of the present invention to provide a method and circuits for associating a complex operator, to each component of an input pattern presented to an input space mapping algorithm based artificial neural network (ANN) in the distance evaluation process wherein said complex operator consists of a function and parameters attached thereto.

It is another object of the present invention to provide a method and circuits for associating a complex operator to each component of an input pattern presented to an input space mapping algorithm based artificial neural network in the distance evaluation process wherein said complex operator is adapted to perform a conditional processing of each pair of input pattern/stored prototype components for optimization thereof.

It is another object of the present invention to provide a method and circuits for associating a complex operator to each component of an input pattern presented to an input space mapping algorithm based artificial neural network in the distance evaluation process which allows a same component to designate objects of different nature, reducing thereby the number of components that are required in the neurons.

It is another object of the present invention to provide a method and circuits for associating a complex operator to each component of an input pattern presented to an input space mapping algorithm based artificial neural network in the distance evaluation process wherein the result of the operation performed by said complex operator may modify or inhibit the elementary distance calculation for at least one subsequent component.

It is another object of the present invention to provide a method and circuits for associating a complex operator to each component of an input pattern presented to an input space mapping algorithm based artificial neural network in the distance evaluation process wherein said function is a mathematical entity (e.g. based on a logic or arithmetic operator) or a set of software instructions, possibly with a condition.

It is another object of the present invention to provide a method and circuits for associating a complex operator to each component of an input pattern presented to an input space mapping algorithm based artificial neural network in the distance evaluation process wherein said parameters include values such as an offset (penalty), a weight, a threshold (condition) or the number to components that must not be processed.

It is still another further object of the present invention to provide a method and circuits for associating a complex operator to each component of an input pattern presented to an input space mapping algorithm based artificial neural network in the distance evaluation process which allow to save room when the ANN is integrated in a silicon chip.

The accomplishment of these and other related objects is achieved by the method and circuits of the present invention which aim to associate a complex operator to each component of an input pattern presented to an input space mapping algorithm based artificial neural network. A complex operator comprises a function and a set of parameters attached thereto. The function is a mathematical entity: a logic operator in the meaning described above (e.g. match(Ai,Bi) or abs(Ai−Bi)), an arithmetic operator (e.g. >, <, . . . ), a combination thereof or a set of software instructions possibly with a condition. Parameters are additional information that can be used in the distance evaluation process. For instance, these parameters are related to technical characteristics such as: a weight (W) to multiply an elementary distance or to be used instead, a threshold representing a condition (C), the number of following components (Nb) that must not be taken in the distance evaluation process or an offset representing a penalty (P). The nature of the function determines the signification and exploitation of the parameters. In addition, depending upon the result of the operation performed by the function (e.g. the calculation of the elementary distance for a determined pair of components), certain subsequent tasks (e.g. this calculation for the following pair(s) of components) can be modified or inhibited in the distance evaluation process. The complex operators are stored in a global memory or in a dedicated neuron modified to fulfill this role. In each neuron of the ANN, a specific circuit decodes the function to extract the operator(s) and exploit the parameters to calculate the elementary distance between an input pattern and a stored prototype for a determined component. For instance, it is adapted to modify the result produced by the operator, e.g. to multiply the result by the weight, to add the penalty, to take a condition into account to overlook a determined number of following components that would otherwise be normally processed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DESCRIPTION OF THE PREFERRED EMBODIMENTS

Because the complex operator that is associated to each component of the input pattern/stored prototypes can be different from one component to another, the novel ANN disclosed in the above mentioned co-pending (unpublished) patent application is required and will be now described by reference to FIGS. 1-3 using the same definitions (whenever possible) that are briefly summarized below.

The component norm (C_norm), now labeled component operator or C_op in short for consistency with the following description, is stored either locally in the neuron or in a "global memory" common to the whole ANN. In this case, the global memory stores a whole set of C_operators, so that for a determined input pattern component, the same operator is associated with all the neurons. The C_operator will be labeled "Local C_operator" in the first case and "Global C_operator" in the second case, or L_C_op and G_C_op in short respectively. When an input pattern is compared with a stored prototype in a neuron, the processing of each pair of corresponding components (Ai,Bi) using the specific C_op associated therewith provides an elementary (or partial) distance value. All the obtained elementary distance values are combined to provide a final distance value using a second type of norm referred to as the "distance" norm. For example, if the L1 norm is used, the C_op is the "absolute value of a difference" operator and the distance norm is the "addition" operator. If the Lsup norm is used, the C_op is still the "absolute value of a difference" operator and the distance norm is the "maximum value" operator. Depending upon the nature of the component operators and distance norms, the final value can be considered either as a distance in a pure mathematical sense (e.g. if the L1 or Lsup norm is used) or not. However, for the sake of simplicity with regards to the above mentioned U.S. patent, the term "distance" that will be used in the following description must be understood as generic. In other words, the resulting value of the comparison between an input pattern and a stored prototype will be referred to as a "distance" even if it does not fully meet all the criteria of its mathematical definition. The following description will be made by reference to said "distance" norm, which will be labeled L_D_norm in short, when it is locally stored in each neuron and G_D_norm (generically D_norm) when it is common to all the neurons of the ANN.

Figure 1:
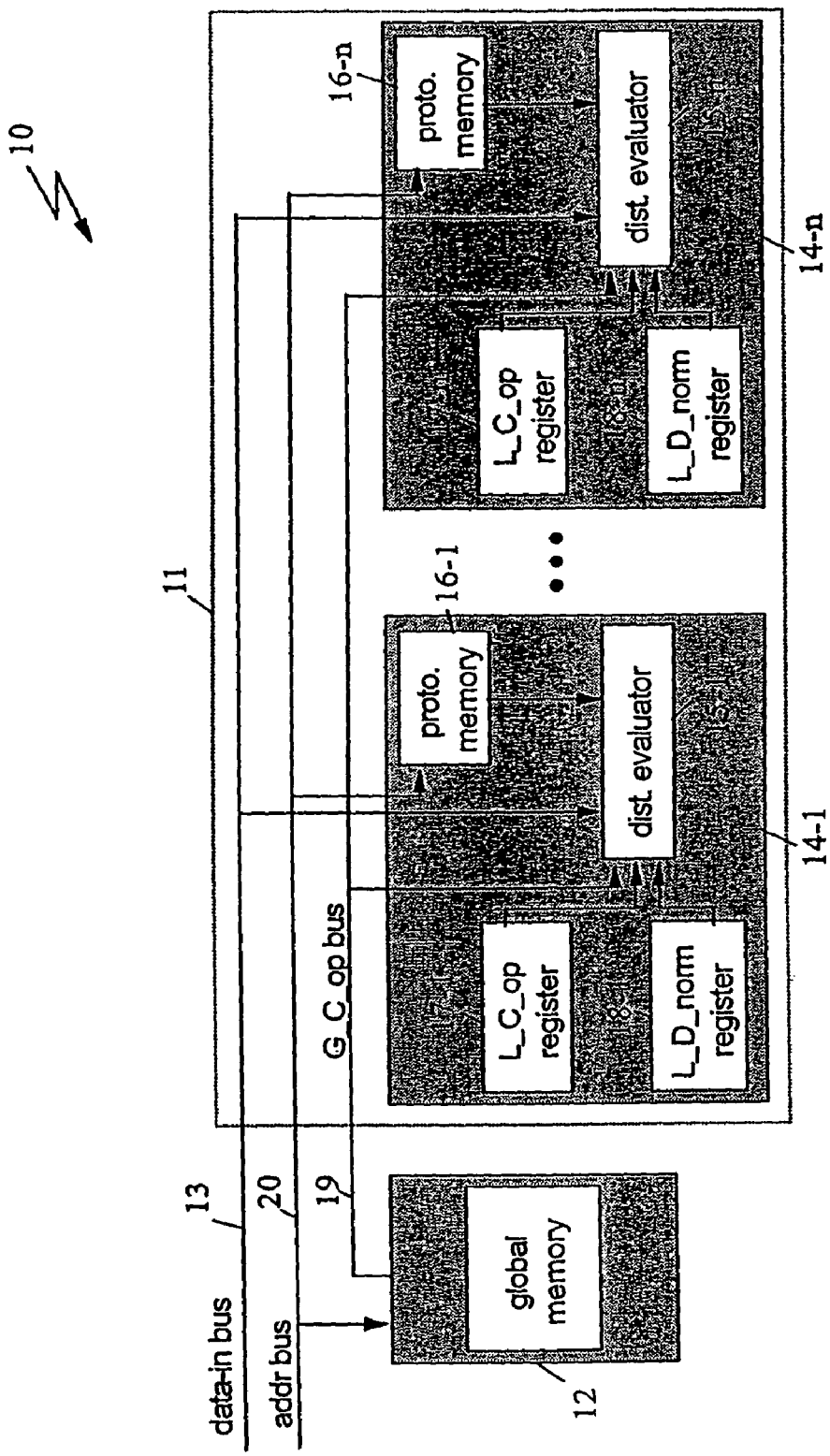
FIG. 1 schematically shows the block architecture of an artificial neural network (ANN) which includes a global memory to store the set of operators associated with each pair of input pattern/stored prototype component and a plurality of neurons.
Figure 2:
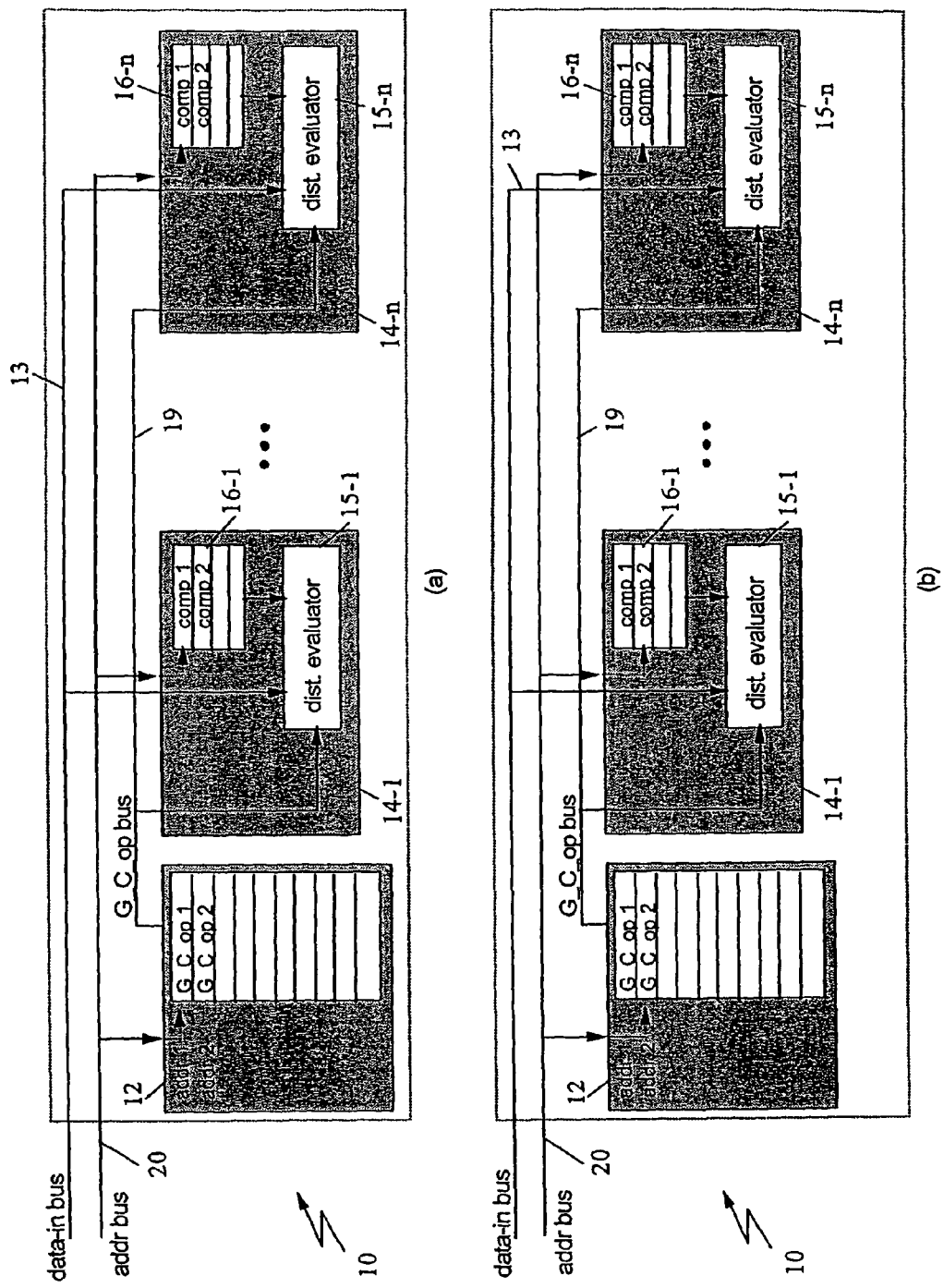
FIG. 2 illustrates the operation of the FIG. 1 ANN to associate the adequate operator with each pair of input pattern/stored prototype components in the distance evaluation process.

Now turning to FIG. 1, there is schematically shown the block architecture of the novel artificial neural network (ANN) 10 described in the above mentioned co-pending patent application. ANN 10 comprises an ANN 11 and the global memory mentioned just above that is referenced 12. Global memory 12 is designed to store a plurality P of component operators (i.e. one per component). Data coming from a host computer or the control logic (not shown) are fed into the ANN 11 via data-in bus 13 as standard. ANN 11 comprises a plurality of n independent neurons 14-1 to 14-n, generically referenced 14. In the particular implementation shown in FIG. 1, a neuron is basically a conventional ZISC® neuron that has been only slightly modified. In FIG. 1, each neuron, e.g. 14-1, includes a distance evaluator 15-1 and a local memory 16-1 to store the prototype components, usually referred to as the prototype memory. The distance evaluator 15-1 is connected to the host computer via the data-in bus 13 and to its prototype memory 16-1 to perform the distance evaluation between the input pattern and the stored prototype by processing each pair of corresponding components as standard to calculate the elementary distances. It further includes registers 17-1 and 18-1 to memorize L_C_operators and L_D_norms that are used to perform the elementary distance calculation and the final distance evaluation respectively. An alternative would be to have a single register common for the whole ANN 10 feeding each neuron 14 with the G_D_norm via a dedicated bus. At this stage of the description, the architecture of ANN 11 and the internal construction of neuron 14-1 (with the exception of register 17-1) are substantially those described in details in the aforementioned U.S. patent. However, with respect to that document, the structure of a ZISC® neuron has been slightly modified to take into account that the distance evaluator referenced 15-1 is connected to the global memory 12 via a bus referred to as the G_C_op bus 19 and to said register 17-1. In addition, the address bus referenced 20 is not only connected to the prototype memory placed in each of neurons 14-1 to 14-$n$ as practiced in the ZISC® chip but also to the global memory 12, so that for each input pattern component, the corresponding operator associated therewith can be selected.

It is to be noted that several ANNs 10 can be combined in a single one which would thus include either several global memories (one per ANN) or only one global memory common for all.

Still referring to FIG. 1, the global operation of ANN 10 is now described. For the sake of illustration, let us assume that the global memory 12 is constructed by a set of registers as standard. Using the hypothesis that input pattern components are presented in a sequential way to the ANN 10, each time the host computer presents an input pattern component to the ANN 10 via data-in bus 13, it points on a determined address in the global memory 12 to output the corresponding global component operators (G_C_ops) and in all the prototype memories 16-1 to 16-$n$ via addr bus 20 to select the corresponding prototype component. As a result, in each neuron 14, the G_C_op (or L_C_op), the stored prototype component, and the input pattern component corresponding to that address are made available in the distance evaluator 15. Each neuron 14 then performs the elementary (or partial) distance calculation between the input pattern component and the corresponding stored prototype component using the associated G_C_op (or L_C_op). Elementary distances are combined to update the distance with the selected L_D_norm as standard. This process is continued in sequence until all the components of the input pattern have been processed and the final distance value has been obtained for each neuron.

The principle of simultaneous processing each corresponding pair of input pattern component and stored prototype component with their associated C_op will be now described in more detail by reference to FIGS. 2($a$) and 2($b$). To each input pattern component, the host computer (or the control logic) emits an address which is used to simultaneously access the associated G_C_op in the global memory 12 and the corresponding component of the stored prototype in each neuron. Let us give a practical example. When the first input pattern component is fed into ANN 10 via the data-in bus 13, the first address (addr 1) is activated, so that the G_C_op 1 at the first location of global memory 12 and the first prototype component comp 1 in each prototype memory 16-1 to 16-$n$ are selected as shown in FIG. 2($a$). Thus, the first input pattern component, the G_C_op 1 and the first prototype component comp 1 are simultaneously associated for a first elementary distance calculation. Note that, because the ANN 10 has a fully parallel architecture, all the first elementary distances are simultaneously obtained. Then, when the second input pattern component is fed into the ANN 10, it is associated the same way with the second norm G_C_op 2 and the second prototype component comp 2 at addr 2 as shown in FIG. 2($b$) to update the partial result of said first elementary distance calculation. These steps are repeated until the last input pattern component has been processed. It has to be understood that although the addresses are consecutive in this example, the addresses could also be arranged randomly as well without any substantial hardware modifications.

Figure 3:
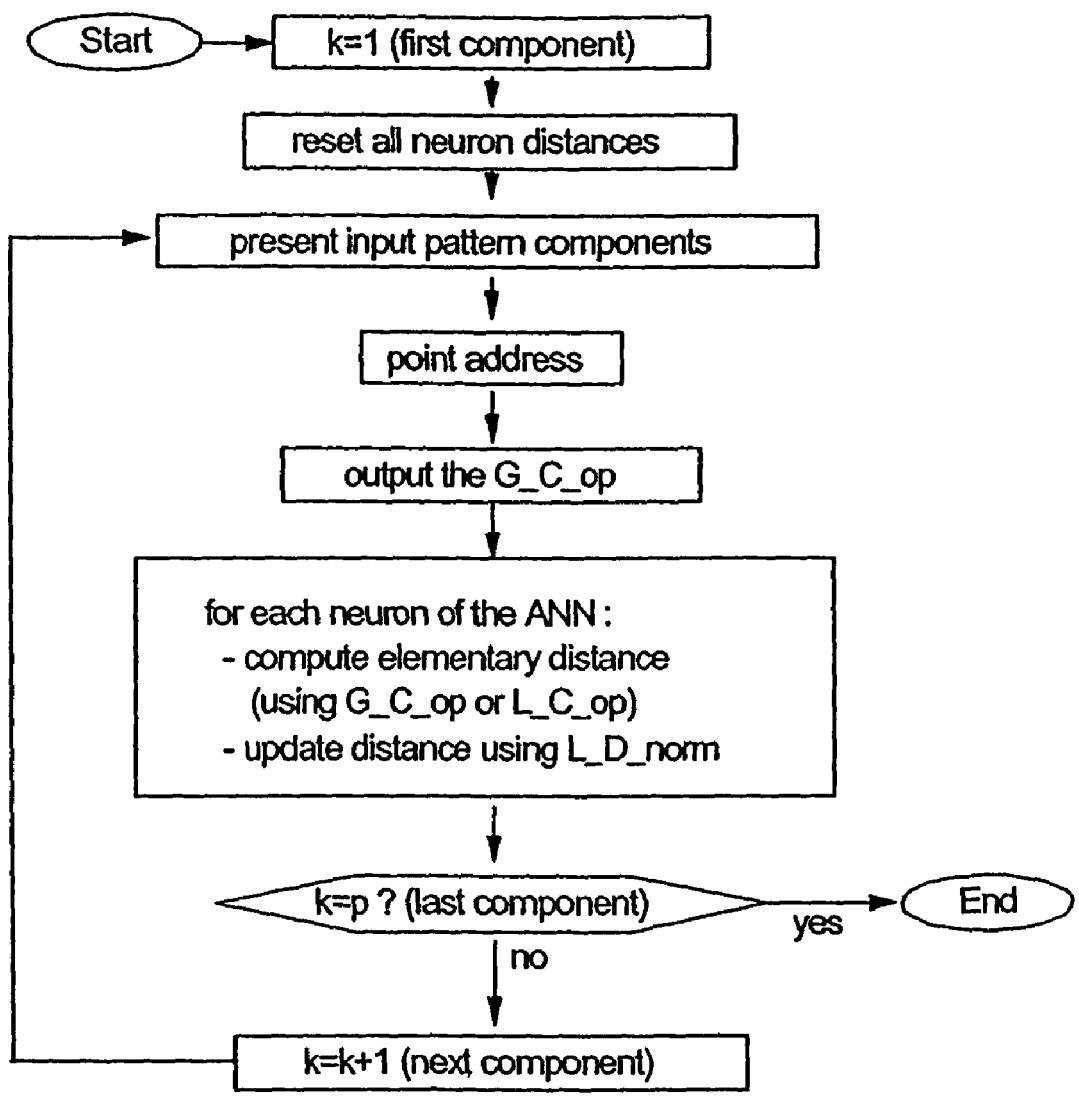
FIG. 3 is a flowchart summarizing the main steps of the method used to associate an operator with each pair of input pattern/stored prototype components in the ANN of FIG. 1.

FIG. 3 shows a flowchart summarizing the above described processing steps.

Figure 4:
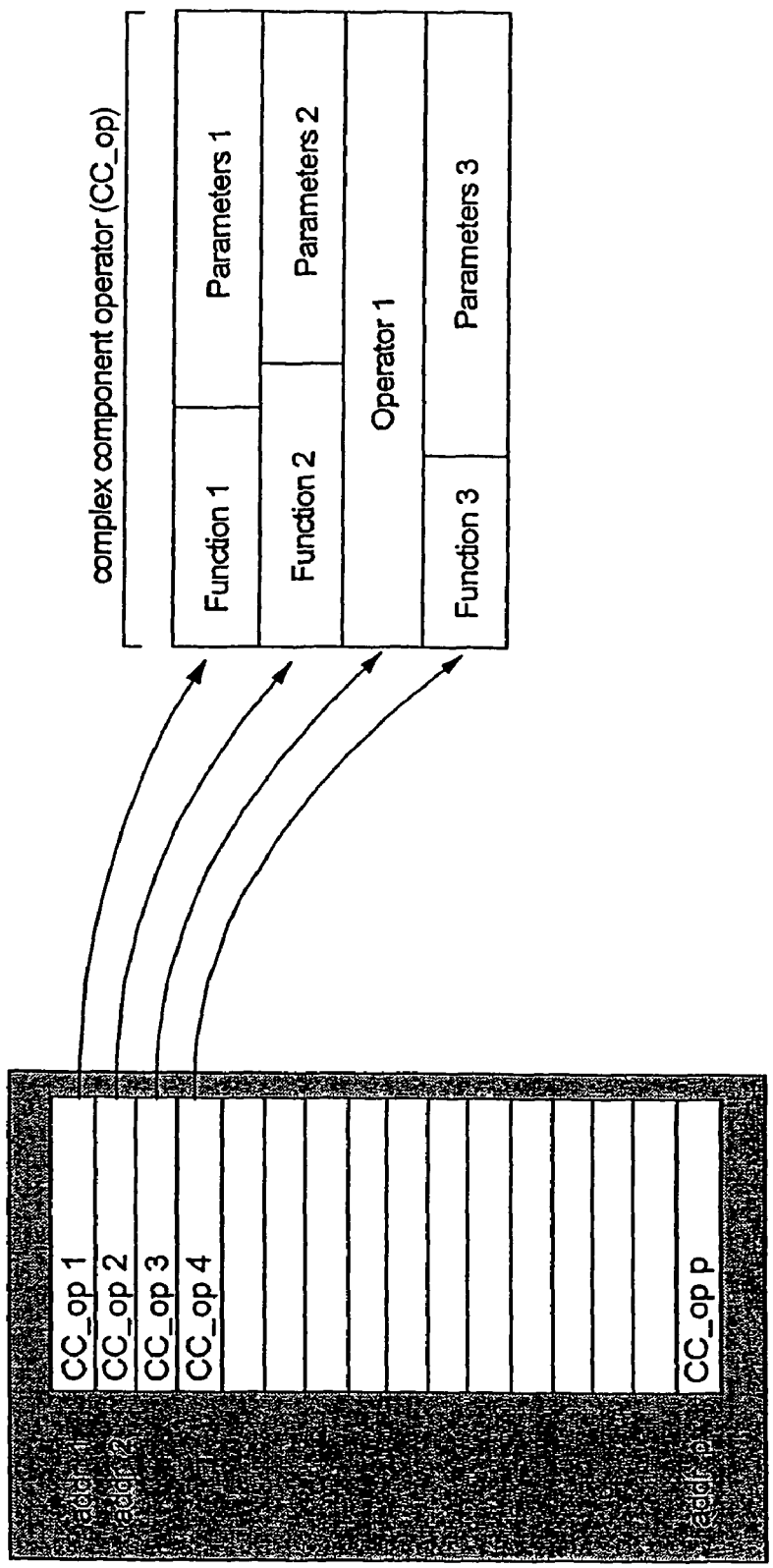
FIG. 4 shows the basic structure of a complex operator consisting of a function and parameters attached thereto to introduce the coding mechanism according to the present invention.

FIG. 4 shows a detailed structure of a set of complex component operators, referred to hereinbelow as CC_ops, according to the present invention. There is one complex operator per input pattern component stored at each location of a specific memory, typically global memory 12. A complex operator describes a function and parameters attached thereto in a coded form. The function is a mathematical entity: either a logic operator in the meaning described above (e.g. match (Ai,Bi), abs(Ai−Bi), . . . ), an arithmetic operator (e.g. >, <, . . . ), a combination thereof or a set of software instructions possibly with a condition. The function determines the signification and the exploitation to be made of the parameters. Parameters are additional information that can be used in the distance evaluation process. For instance, these parameters are related to technical characteristics such as: a component weight (W) to multiply an elementary distance or to be used instead, a threshold representing a condition (C), the number of following components (Nb) that must be inhibited during the distance evaluation process or an offset representing a penalty (P). In this example, a complex norm can be represented by the synthetic expression: (Function; W,C, Nb,P). Other features can be envisioned as well depending upon a user's needs. As apparent in FIG. 4, according to the present invention, the memory can store complex operators stricto sensus, e.g. CC_op 1 which describes the combination: (Function 1, Parameters 1) and simple operators, e.g. CC_op 3 which is reduced to Operator 1 (e.g. Match (Ai,Bi)). Therefore, in the following description, a complex operator (CC_op) will represent either a complex operator or a simple operator (except when otherwise stated).

According to the present invention, a function and the parameters related thereto may be represented by a binary value, in which some bits (e.g. the most significant bits) are used to code the function itself. To illustrate this coding scheme, let us consider different 14-bits coded words, each one representing a complex operator, wherein x is 0 or 1 and wherein the two components on which the elementary distance is evaluated are Ai and Bi (corresponding to an input pattern A and a stored prototype B respectively).

First coded word: xxxxxxxxxxx wherein means the match (Ai,Bi) operator, the next 8 bits represent a weight W, and the last 3 bits are not used.

This coding scheme (abs(Ai−Bi); W,-,-,-) is interpreted as follows:

if Ai and Bi are equal, the elementary distance corresponding to these components Ai and Bi is equal to zero;
if Ai and Bi are not equal, the elementary distance corresponding to these components Ai and Bi is equal to W.

In this case, the elementary distance is equal to W·match(Ai, Bi).

Second coded word: xxxxxxxxxxx wherein means match(Ai, Bi) operator, the next 4 bits represent the number Nb of following components that must not be taken into account for distance evaluation, and the last 7 bits represent a weight W. This coding scheme (match(Ai,Bi); W,-,Nb,-) is interpreted as follows:

if Ai and Bi are equal, the elementary distance corresponding to these components is equal to zero;
if Ai and Bi are not equal, a number Nb of subsequent components following components Ai and Bi in consideration will not be taken into account in the global distance evaluation process and the elementary distance corresponding to these components is equal to W.

In this case, the elementary distance is still equal to W·match (Ai,Bi), but some following components can be inhibited, depending upon the value of parameter Nb.

Third coded word: xxxxxxxxxxx wherein means "absolute value of a difference" operator, i.e. abs(Ai−Bi), the next 5 bits represent a condition C and the last 6 bits represent a weight W.

This coding scheme (abs(Ai−Bi); W,C,-,-) is interpreted as follows:
  if abs(Ai−Bi)<C, the elementary distance corresponding to these components is equal to zero;
  if abs(Ai−Bi)≧C, the elementary distance corresponding to these components is W·abs(Ai−Bi).

Note that if C=0, the elementary distance corresponding to components Ai and Bi is W·abs(Ai−Bi), so that if W=1, this elementary distance is abs(Ai−Bi).

Fourth coded word: 001xxxxxxxxxxx wherein 001 means "absolute value of a difference" operator, i.e. abs(Ai−Bi), the next 5 bits represent a condition C, and the last 6 bits represent a weight W.

This coding scheme (abs(Ai−Bi); W,C,-,-) is interpreted as follows:
  if abs(Ai−Bi)≧C, the elementary distance corresponding to these components is equal to zero;
  if abs(Ai−Bi)<C, the elementary distance corresponding to these components is W·abs(Ai−Bi).

Fifth coded word: 010xxxxxxxxxxx wherein 010 means "absolute value of a difference" operator, i.e. abs(Ai−Bi), the next 4 bits represent a condition C, the next 2 bits represent the number Nb of following components that must not be taken into account for distance evaluation and the last 5 bits represent a penalty P.

This coding scheme (abs(Ai−Bi); -,C,Nb,P) is interpreted as follows:
  if abs(Ai−Bi)/C, the elementary distance corresponding to these components is equal to zero;
  if abs(Ai−Bi)>C, Nb is the number of following components that must not be taken into account for distance evaluation and the elementary distance corresponding to these components is equal to P.

Sixth coded word: 011xxxxxxxxxxx wherein 011 means "absolute value of a difference" operator, i.e. abs(Ai−Bi), the next 4 bits represent a condition C, the next 2 bits represent the number N) of following components that must not be taken into account for distance evaluation and, the last 5 bits represent a penalty P.

This coding scheme (abs(Ai−Bi); -,C,Nb,P) is interpreted as follows:
  if abs(Ai−Bi)≦C, the elementary distance corresponding to these components is equal to abs(Ai−Bi);
  if abs(Ai−Bi)>C, Nb is the number of following components that must not be taken into account for distance evaluation and the elementary distance corresponding to these components is equal to P+abs(Ai−Bi).

It is interesting to remark that the elementary distance may now take a number of values, e.g. W·match(Ai,Bi), abs(Ai−Bi), W·abs(Ai−Bi), P+abs(Ai−Bi), and so forth, wherein match(Ai,Bi) and abs(Ai−Bi) are logic operators that are commonly used in the elementary distance calculation. Note also that the number of bits used to represent the function and the parameters can be variable and therefore the coded word length.

As it will obvious for those skilled in the art, the previous examples are presented for the sake of illustration, other parameters with different meanings or different coding schemes can be defined by the user.

Figure 5:
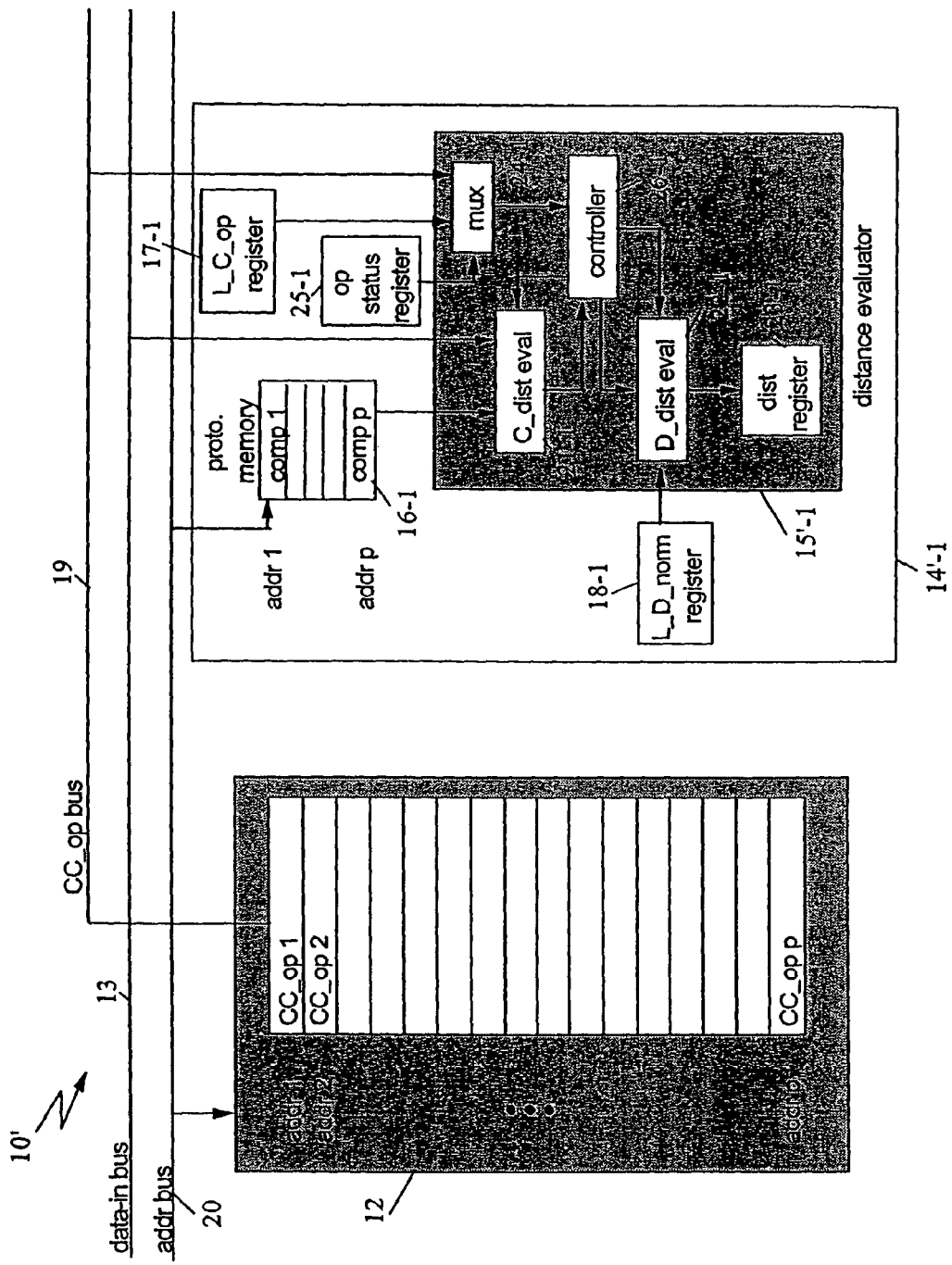
FIG. 5 shows the block architecture of an ANN limited to one standard neuron to process a complex operator according to the present invention and the global memory which stores the complex operators.
Figure 8:
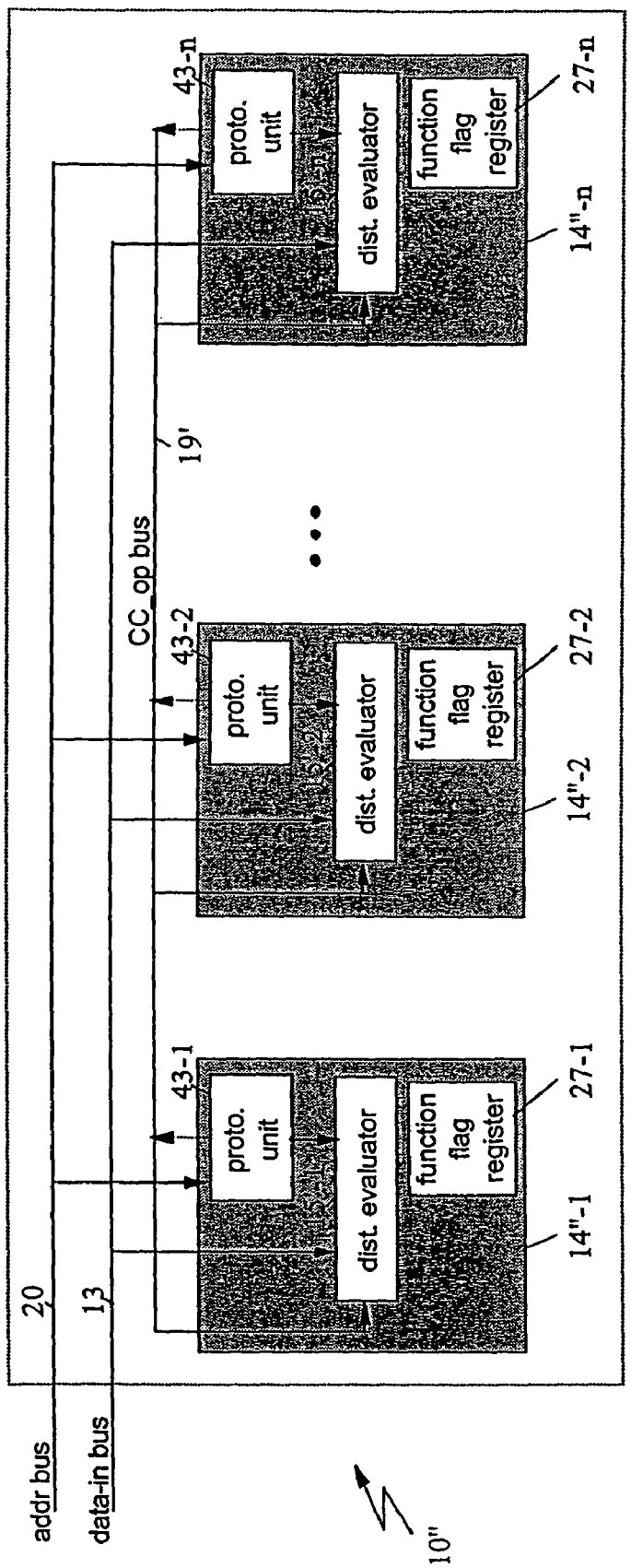
FIG. 8 shows the block architecture of another ANN which incorporates the neuron of FIG. 6 to eliminate the need of the global memory, reducing thereby the consumed silicon area when the ANN is integrated in a silicon chip.

Two ANN architectures adapted to associate a complex component operator (CC_op) to each component of an input pattern having p components in the process of evaluating the final distance between the input pattern and the prototypes stored in the neurons of the ANN will be now described in conjunction with FIGS. 5 and 8. In either ANN, the key element is an improved neuron which incorporates a circuit to decode the function in order to determine the specific processing to be applied to the parameters and the tasks to be carried out.

FIG. 5 shows the architecture of a first ANN referenced 10' limited to the global memory and only one neuron, basically a ZISC® neuron, but improved to process one complex operator for each pair of components according to the present invention. FIG. 5 shows the internal organization of the global memory 12 now used to store the CC_ops and the essential elements of the first improved neuron referenced 14'-1.

The internal organization of global memory 12 is schematically shown on the left-hand side of FIG. 5. As apparent in FIG. 5, there are p memory locations corresponding to the p components of the input pattern/stored prototypes that are accessed by an address (addr 1 to addr p) emitted by the host computer via addr bus 20. At each memory location, the coded value of the CC_op associated with a component is stored. Two successive addresses may represent either the same complex operator or two different complex operators.

Now turning to the right-hand side of FIG. 5, the essential elements of neuron 14'-1 are shown in more detail. Distance evaluator 15'-1 first comprises blocks 21-1, 22-1 and 23-1. Block 21-1 is labeled C_dist eval because it performs the elementary distance calculation on a pair of corresponding components, i.e. of the same rank. This block is connected to the host computer via data-in bus 13 and to the prototype memory 16-1. Block 22-1 labeled D_dist eval is controlled by the operator representing the distance norm (D_norm), e.g. the "addition" operator, stored in register 18-1 and updates the distance with the calculated elementary distances (partial results) as the count of components progresses. Block 23-1 labeled dist register stores the final distance when all the components of the input pattern have been processed. The distance evaluator 15'-1 just as it is, the prototype memory 16-1 (connected to the host computer via addr bus 20) and register 18-1 that stores the L_D_norms are substantially consistent with the description given in the aforementioned U.S. patent. Distance evaluator 15'-1 further comprises a 2-way multiplexor (or selector) 24-1 which is connected to register 17-1 on the one hand, and to the CC_op bus 19 on the other hand. Multiplexor 24-1 is controlled by one or more status bits stored in the operator status register 25-1 to select either the L_C_op or the CC_op to be applied on the inputs of block 26-1. Note that register 17-1 could store either only simple component operators (C_ops) such as practiced in the above mentioned co-pending EP patent application or both simple and complex component operators (CC_ops). Distance evaluator 15'-1 may include block 26-1 labeled complex operator controller. Block 26-1 is connected to the output of the C_dist eval block 21-1 and transmits the elementary distance to the D_dist eval block 22-1. It also generates a first signal to determine the operations to be carried out in the C_dist eval block 21-1 and a second signal to control the D_dist eval block 22-1 typically for inhibition purposes. If a simple operator (stored in the L_C_op register 17-1) is used, controller block 26-1 forces C_dist eval block 21-1 to directly transmit the result to the D_dist eval block 22-1. If, instead, a complex operator is used, it decodes the function and determines the operations to be performed with the parameters according to the rules defined in the above described examples. A detailed description of a typical hardware implementation of controller block 26-1 will be given later on by reference to FIG. 6 for the sake of illustration. It is also to be noted that, the L_C_op register 17-1, operator status register 25-1 and multiplexor 24-1 are not mandatory blocks, the complex operator controller 26-1 can be directly controlled by the CC_ops stored in global memory 12 via bus 19.

Each time an input pattern component is sent to neuron 14'-1 by the host computer on data-in bus 13, the CC_op stored in global memory 12 associated thereto (at an address defined by the host computer) is also simultaneously transmitted to improved neuron 14'-1 via the CC_op bus 19'. The prototype component (corresponding to that address) which is locally stored in the prototype memory 16-1 is directly available. It is the role of address bus 20 under the host computer control to perform the addressing function of both the global memory 12 and the prototype memory 16-1 as standard. Now, depending upon the binary value stored in the operator status register 25-1 which controls multiplexor 24-1, the CC_op memorized either in register 17-1 or in global memory 12 is selected. The selected CC_op is used to perform the elementary distance calculation on the pair of components in consideration. Then, using the L_D_norm stored in the L_D_norm register 18-1, the distance between the input pattern and the stored prototype is updated in box 22-1 and, as it is practiced in the ZISC® neuron, the distance evaluation may be continued through a loop process, until all the components of the input pattern have been processed and the final distance has been evaluated and stored in register 23-1.

Figure 6:
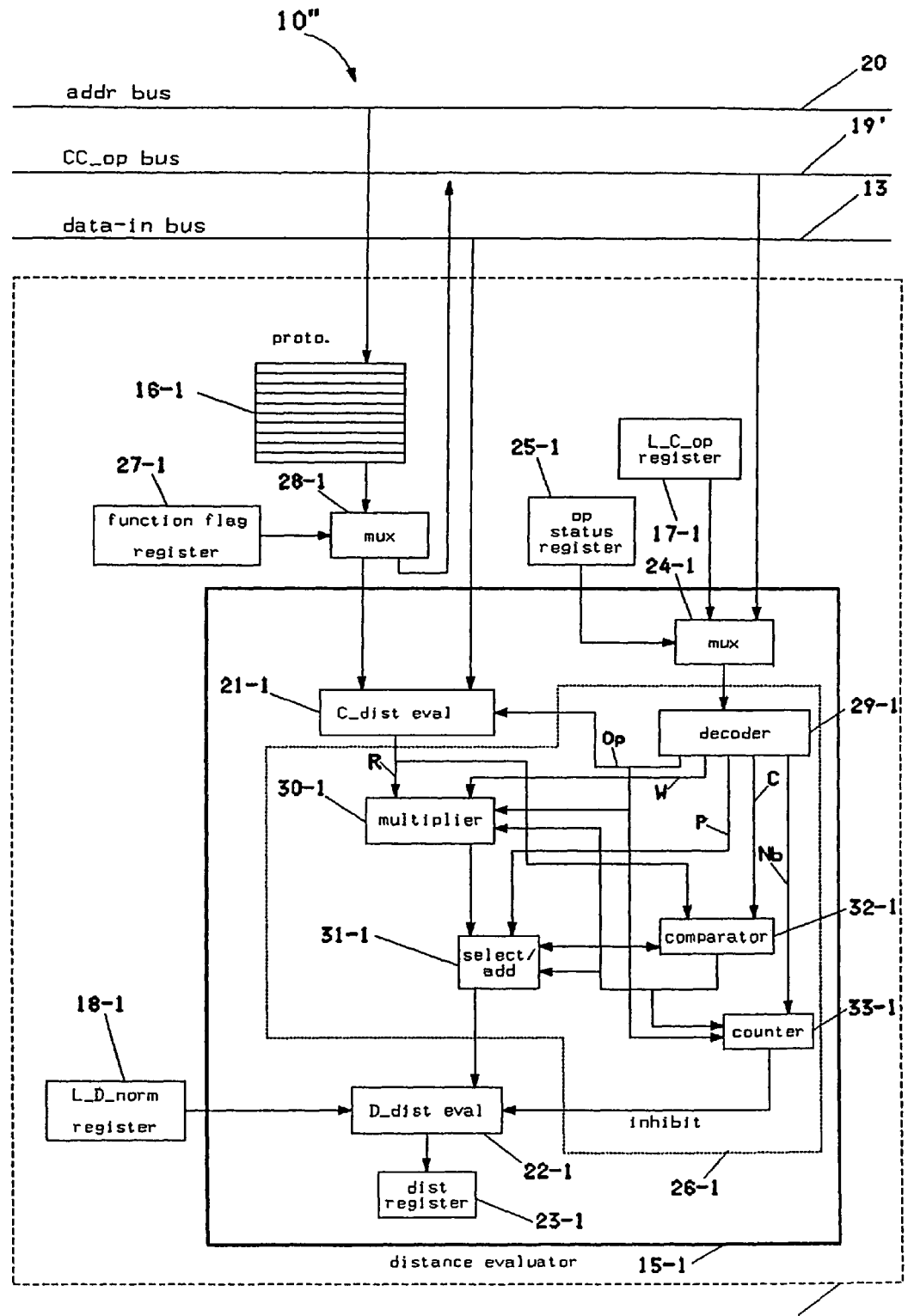
FIG. 6 shows the block architecture of the neuron of FIG. 5 when further modified to operate to store either the prototype components as standard or to store the complex operators still according to the present invention, so that in this case, the global memory is no longer physically necessary in the ANN.

FIG. 6 shows a new ANN referenced 10'' wherein the block architecture of the neuron 14'-1 of FIG. 5 has been further modified to gain the additional capability of locally storing the complex operators still according to the present invention so that the global memory 12 is no longer physically necessary in the ANN 10''. The particular structure of neuron 14''-1 allows it to operate as a standard neuron or as a dedicated neuron to replace the global memory 12 of FIG. 5. Turning to FIG. 6, the dual neuron 14''-1, has an internal construction which directly derives from the one of neuron 14'-1 of FIG. 5. A function flag is used to determine whether the dual neuron is used as usual or as a dedicated neuron to store the complex operators. The function flag register referenced 27-1 controls multiplexor (or selector) 28-1. Depending upon the function flag value, multiplexor 28-1 either applies a prototype component to the C-dist eval block 21-1 or transmits a CC_op to bus 19' (plays the role of bus 19) for exploitation by all the neurons connected thereon. Therefore, dual neuron 14''-1 has two operating modes. In the first mode, it operates like neuron 14'-1, while in the second mode, it plays the role of the global memory 12 (at the only cost of adding the function flag register 27-1 and the multiplexor 28-1). Consequently, the prototype memory 16-1 in neuron 14''-1 is now adapted to store two different types of data: prototype components or CC_ops. A typical architecture of controller block 26-1 implemented in distance evaluator 15'-1 of neuron 14'-1 shown in FIG. 5, to decode the function and perform the operations resulting therefrom will be now described by reference to FIG. 6. Turning again to FIG. 6, controller block 26-1 includes a decoder 29-1, a multiplier 30-1, a selector/adder 31-1, a comparator 32-1 and a counter 33-1. The output of multiplexor 24-1 is connected to the input of decoder 29-1, so that decoder 29-1 receives a CC_op either from L_C_op register 17-1 via the CC_op bus 19' depending upon operator status value. A bus, labeled Op bus, transporting the function bits (see above examples), interconnects the decoder 29-1 with. the C_dist eval block 21-1 and all the other blocks 30-1 to 33-1 for their appropriate operation. Other buses connected between decoder 29-1 and circuits 30-1 to 33-1 transport the parameters. The W bus is connected to a first input of multiplier 30-1 (the other input is connected to an output of the C_dist eval block 21-1), the P bus is connected to a first input of the selector/adder 31-1 (the other input is connected to the output of multiplier 30-1), the C bus is connected to the comparator 32-1 and the Nb bus is connected to the counter 33-1. The output of comparator 32-1 is connected to circuits 30-1, 31-1 and 33-1 and the output of selector/adder 31-1 is connected to an input of the D_dist eval block 22-1. Finally, the output of counter 33-1 that transports an inhibition signal is connected to another input of the D_dist eval block 22-1. The output of the D-dist eval block 22-1 is connected to dist register 23-1.

The C_dist eval block 21-1 receives the input pattern component and the stored prototype component and performs the calculation of either the elementary distance (simple operator) or an intermediate evaluation thereof (complex operator) under decoder 29-1 control. In both cases, the decoder 29-1 extracts the function, the coded value of which is applied to all other blocks of block 26-1 and to the C_dist eval block 21-1 via the Op bus mentioned above for appropriate operation. The result of the evaluation made in C_dist block 21-1, i.e. either the elementary distance (simple operator) or an intermediate value thereof (complex operator), is labeled R. If the function is reduced to a simple operator (e.g. match(Ai,Bi) or abs(Ai–Bi)), the C_dist eval block 21-1 uses this simple operator to transmit the result R (i.e. the elementary distance) directly to the D_dist eval block 22-1 without any change in circuits 30-1 and 31-1. In other words, there is no processing of the elementary distance in block 26-1, the distance evaluator 15'-1 operates as standard. If a complex norm is used, the C_dist eval block 21-1 still uses a simple operator determined by the decoded function to evaluate the elementary distance, but in this case a further processing is required in norm controller block 26-1. As apparent in FIG. 6, the result R is applied to the multiplier 30-1 and comparator 32-1. Comparator 32-1 receives as inputs: the result R and a condition C from decoder 29-1 via the C bus. On the other hand, multiplier 30-1 receives as inputs: the result R, a weight W from decoder 29-1 via the W bus and the result of the comparison performed in the comparator 32-1. Depending upon the decoded function and the result of comparator 32-1, multiplier 30-1 either directly outputs the result R or multiplies the result R by the weight W. Finally, either R or W·R value is sent to selector/adder 31-1. Selector/adder 31-1 receives as inputs: the result R or W·R supplied by multiplier 30-1 and a value, e.g. a penalty, from decoder 29-1 that can be added thereto. Selector/adder 31-1 is controlled by the result of the comparison performed in the comparator 32-1 and the decoded function via the Op bus. As a result, selector/adder 31-1 is adapted to generate the following values: R, P, R+P, W·R, W·R+P and so forth, wherein each value represents the elementary distance to be processed in the D_dist eval block 22-1. Counter 33-1 receives as input the number Nb of following components that must not be taken into account for the distance evaluation from decoder 29-1 via the Nb bus. Counter 33-1 is decremented controlled by the decoded function and by the result of the comparison performed in the comparator 32-1. As usual, the content of counter 33-1 is decremented from Nb to zero each time a component has been processed, in the meantime, the inhibition signal is activated. D_dist avaluator 22-1 receives as input the result of selector/adder 31-1 to update the distance and stores the final distance in register 23-1. The operation performed on these inputs in block 22-1, depends upon the L_D_norm stored in L_D_norm register 18-1. The evaluation performed in D_dist evaluator 22-1 may be inhibited by the signal output by the counter 33-1.

Either neuron 14'-1 or the dual neuron 14''-1 described by reference to FIGS. 5 and 6 respectively is well adapted to process any type of complex norms due to the implementation of complex norm controller 26-1 in both cases. For example, let us consider the sixth coded word 011xxxxxxxxxxx which corresponds to the complex norm (abs(Ai−Bi); -,C,Nb,P) with the same notations as above where Ai and Bi still represent the input pattern component and a stored prototype component of the same rank i respectively. This complex norm is decoded in decoder 29-1, so that the abs(Ai−Bi) operator is to be used in the C_dist eval block 21-1 to perform the elementary distance evaluation. The result R=abs(Ai−Bi) and the condition C (via the C bus) are sent to comparator 32-1. The number Nb of following components that must not be taken into account in the distance evaluation process is sent to counter 33-1 and the penalty P is sent to selector/adder 31-1. The result R is compared with condition C in comparator 32-1. If R≦C, the comparator 32-1 commands the multiplier 30-1 to transmit the result R to the selector/adder 31-1 without modification. The distance is thus updated with an elementary distance equal to R. If R>C, the selector/adder 31-1 which receives R and P values, adds them and transmits the sum to the D_dist evaluator 22-1. In this case, the distance is thus updated with an elementary distance equal to R+P. In addition, the comparator 32-1 commands the counter 33-1 to inhibit D_dist eval block 22-1 for the evaluation of a number Nb of following components.

It is to be noticed that decoder 29-i, or the whole distance evaluator 15'-1, may be a programmable circuit, e.g. a Field Programmable Gate Array (FPGA), so that it is able to handle any kind of complex norm and the parameters related thereto depending upon the application.

Figure 7:
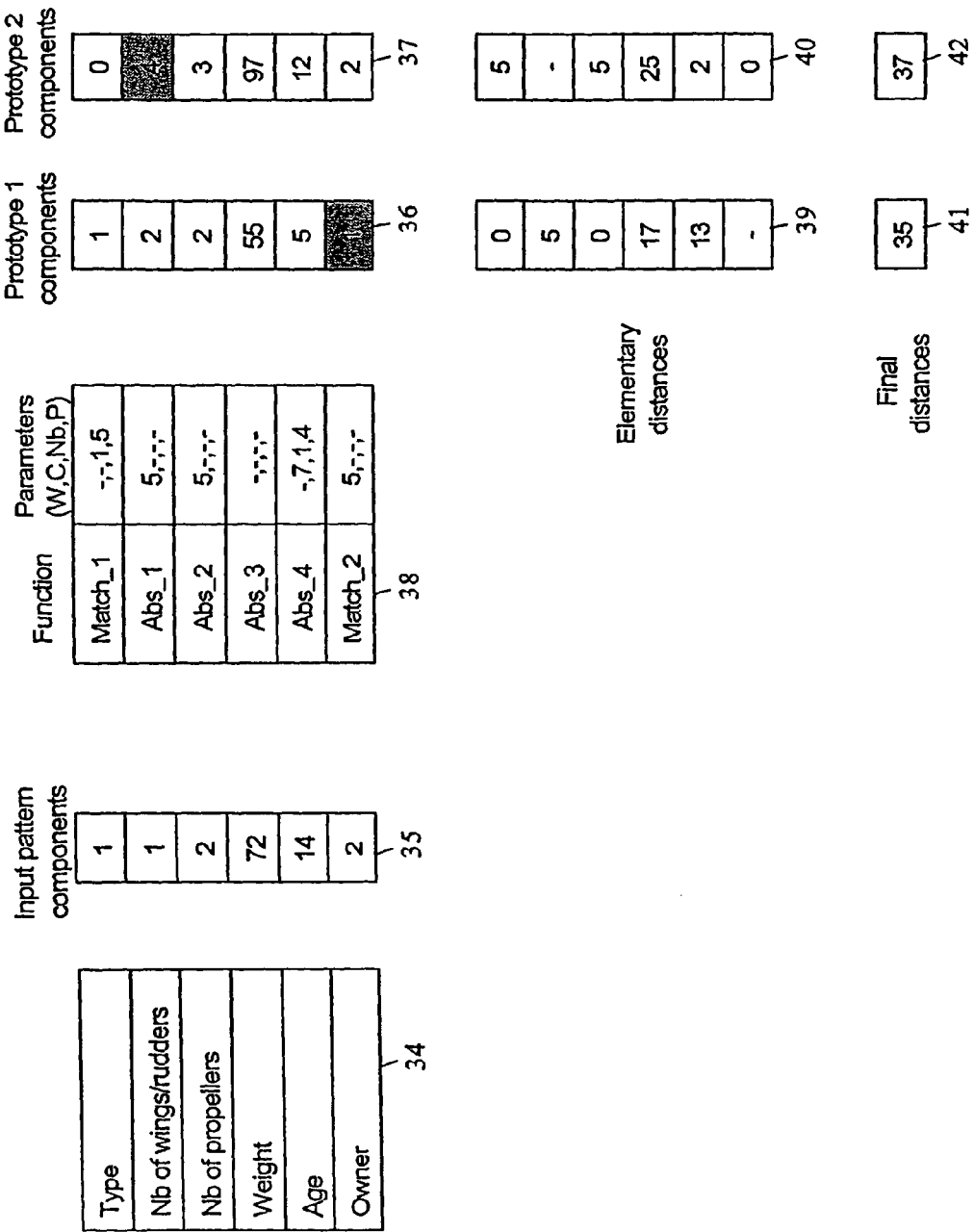
FIG. 7 illustrates an example of reducing to practice the method of the present invention.

The following example illustrated by reference to FIG. 7 is now described. The input pattern and stored prototypes comprise 6 components 34. The first component represents the type of a transport means (plane or boat), the second one is the number of wings or rudders depending upon the type of transport means, the third one represents the number of propellers, the fourth one is the weight, the fifth one is the age and the last one represents the owner of the transport means. Note by the way, that according to one aspect of the present invention, the first and second components designate objects of a different nature, a feature not allowed in the conventional ANNs. An input pattern 35, has components (1,1,2,72,14,2). Pattern 35, is presented to an ANN comprising two improved neurons, each neuron storing a prototype as standard. The components are (1,2,2,55,5,1) and (0,4,3,97,12,2), for the first 36 and second 37 stored prototypes respectively. A global memory 12 or a dual neuron 14''-1 is used to store the complex operators, i.e. the function and the parameters associated thereto for each component as depicted in 38. The meaning of the functions and parameters associated thereto used in this example are:

Match_1:
  if the components are equal, the elementary distance is equal to zero;
  if the components are not equal, the elementary distance is equal to a penalty P=5 and the following component must not be taken into account for the distance evaluation (Nb=1).
Abs_1: the elementary distance is equal to the absolute value of the component difference, i.e. (abs(Ai−Bi)), multiplied by a weight W=5, so that the elementary distance is equal to 5·abs(Ai−Bi).
Abs_2: same as Abs_1.
Abs_3: same as Abs_1 without weight, so that the elementary distance is equal to abs(Ai−Bi).
Abs_4
  if the absolute value of the difference of the components (abs(Ai−Bi)) is equal or greater than a condition C=7, the elementary distance is equal to penalty P=4 plus the result of the absolute value of the component difference (abs(Ai−Bi)) and the number Nb=1 of the following component that must not be taken into account for the distance evaluation;
  if the absolute value of the difference of the components (abs(Ai−Bi)) is less than the condition C=7, the elementary distance is equal to the result of the absolute value of the component difference (abs(Ai−Bi)).
Match_2:
  if the components are equal, the elementary distance is equal to zero;
  if the components are not equal, the elementary distance is equal to a weight W=5.

The evaluation of the elementary distances between the input pattern and the two stored prototypes is performed for each component of the input vector (the results are depicted in 39 and 40), then the final distances which result from the continuous updating of said elementary distances are determined (shown in 41 and 42). The D_norm that is used in this example is the "addition" operator. Still referring to FIG. 7, let us consider the first input pattern component and its associated complex operator: (Match_1; -,-,1,5). For the first stored prototype, because the two components are equal to 1, the elementary distance is equal to zero (see 39). For the second stored prototype, because the two components 1 and 0 do not match, the elementary distance is thus equal to penalty 5 (see 40) and the following component will not be taken into account as depicted in 37. The difference between the second input pattern component and the second component of the first stored prototype is abs(1−2)=1, thus the elementary distance is 5·abs(1−2)=5 (see 39). As far as the second stored prototype component is concerned, the value 4 of the result (see 37) is not taken into consideration in the evaluation of the final distance, as apparent in 40. For the third component, the elementary distances between the input pattern and the two stored prototypes are 0 and 5 respectively. For the fourth component, the elementary distances between the input pattern and the two stored prototypes are 17 and 25 respectively. Now let us consider the fifth component. Because, the difference between the fifth components of the input pattern and the first prototype is greater than condition C=7 (abs(14−5)>7), the elementary distance is 4+abs(14−5)=13 and the following component will not be taken into account for distance evaluation as depicted in 36. The difference between the fifth components of the input pattern and the second prototype is less than condition C=7 (abs(14−12)<7), the elementary distance is abs(14−12)=2. The last component of the second stored prototype is equal to the last component of the input pattern, thus the elementary distance between these components is equal to zero. The sums of the elementary distances that are obtained for the first and second stored prototypes are equal to 35 and 37 as depicted in 41 and 42 respectively.

Assuming the KNN mode is used, it results from 41 and 42 that the first stored prototype is closer to the input vector than the second one.

FIG. 8 shows the architecture of another ANN referenced 10'' when the dual neuron of FIG. 6 is used to store the CC_ops according to the present invention. In FIG. 8, several circuit blocks shown in dual neuron 14''-1 of FIG. 6 have been merged in a single block labeled prototype unit referenced 43-1. The dual neuron containing the CC_ops is selected according to its function flag register which determines its operating mode. Each time an input pattern component is fed into ANN 10'', the CC_op, stored in its appropriate prototype unit 43-1, 43-2, . . . or 43-n is output and associated thereto for distance evaluation in all the other remaining neurons 14"-1, 14"-2, . . . and 14"-n thereof.

It is to be noticed that according to the present invention, the number of required components in the neurons of either ANN 10' or 10" can be significantly limited since components may now have different meanings depending upon the values of other components. As a consequence, the consumed silicon area is significantly reduced when the ANN 10" is integrated in a silicon chip. This important feature is obtained due to the coding operator mechanism described above that allows one to perform conditional operations. Note that, ANN 10" which decreases the amount of memory that is required for the CC_op storage, further reduces the consumed silicon area when the ANN is integrated in a silicon chip.

The above described method can be even further generalized to the evaluation of distances in parallel computing systems.

While the invention has been particularly described with respect to a preferred embodiment thereof it should be understood by one skilled in the art that the foregoing and other changes in form and details may be made therein without departing from the spirit and scope of the invention as defined by the appended claims.

What is claimed is:

1. An artificial neural network having a plurality of neurons adapted to associate a complex component operator to each of a plurality of components of an input pattern in the process of evaluating a final distance between the input pattern and a plurality of prototypes stored in the neurons of the artificial neural network comprising:
   data-in transmitting means for applying input pattern components to each of the neurons;
   storage means to store and apply a plurality of complex component operators to each of the neurons via a bus, wherein each of the complex component operators has a function and at least one parameter attached thereto;
   said plurality of neurons in which each of the neurons has a prototype memory to store a plurality of components of a prototype and distance evaluation means connected to said prototype memory, to said storage means via said bus and to said data-in transmitting means;
   addressing means for applying the input pattern components, the corresponding one of the plurality of complex component operators associated therewith and the corresponding stored prototype component to said distance evaluation means in each of the neurons;
   means for applying a distance norm to the distance evaluation means;
   wherein said distance evaluation means are adapted to perform an elementary distance calculation between the corresponding components of the input pattern and the stored prototype using the corresponding complex component operator associated thereto for each component, said complex component operator being obtained by decoding of said function and processing of said at least one parameter and said distance evaluation means is also adapted to combine said calculated elementary distance to determine the final distance using said distance norm.

2. The artificial neural network of claim 1 wherein the function is a mathematical entity comprising either a logic operator, an arithmetic operator, a combination thereof, a set of software instructions, or a set of software instructions having a condition.

3. The artificial neural network of claim 1 wherein said at least one parameter includes either a component weight to multiply an elementary distance, a threshold representing a condition, the number of following components that must be inhibited during the distance evaluation process or an offset representing a penalty.

4. The artificial neural network of claim 1 wherein said storage means comprises a physical memory common to all the neurons of the artificial neural network to store the plurality of complex component operators.

5. The artificial neural network of claim 1 wherein said storage means comprises of the prototype memory in each neuron that is adapted to store either the prototype components or the complex component operators.

6. The artificial neural network of claim 5 wherein each neuron further comprises means for selecting either the prototype components or the complex component operators.

7. A method for associating a complex component operator to each component of an input pattern having a plurality of components in the process of evaluating a final distance between said input pattern and prototypes stored in neurons of an artificial neural network using a distance norm, wherein said complex component operator comprises a function and at least one parameter attached thereto, said method comprising the steps of:
   a) resetting the final distance for each neuron;
   b) pointing the address corresponding to said component;
   c) presenting the input pattern component corresponding to that address to each neuron;
   d) getting the complex component operator corresponding to that address;
   e) decoding the complex component operator to extract the function and processing the at least one parameter according to the function;
   f) calculating an elementary distance using the decoded function for each neuron;
   g) conditionally updating the final distance by the elementary distance using the distance norm for each neuron; and,
   h) repeating steps b) to g) until all said plurality of components have been processed allowing thereby the evaluation of the final distance for each neuron.

* * * * *